March 10, 1931. J. B. TRIPLETT 1,795,322
ROTATABLE AND RELEASABLE FISHING TOOL WITH CIRCULATION
Filed May 6, 1926
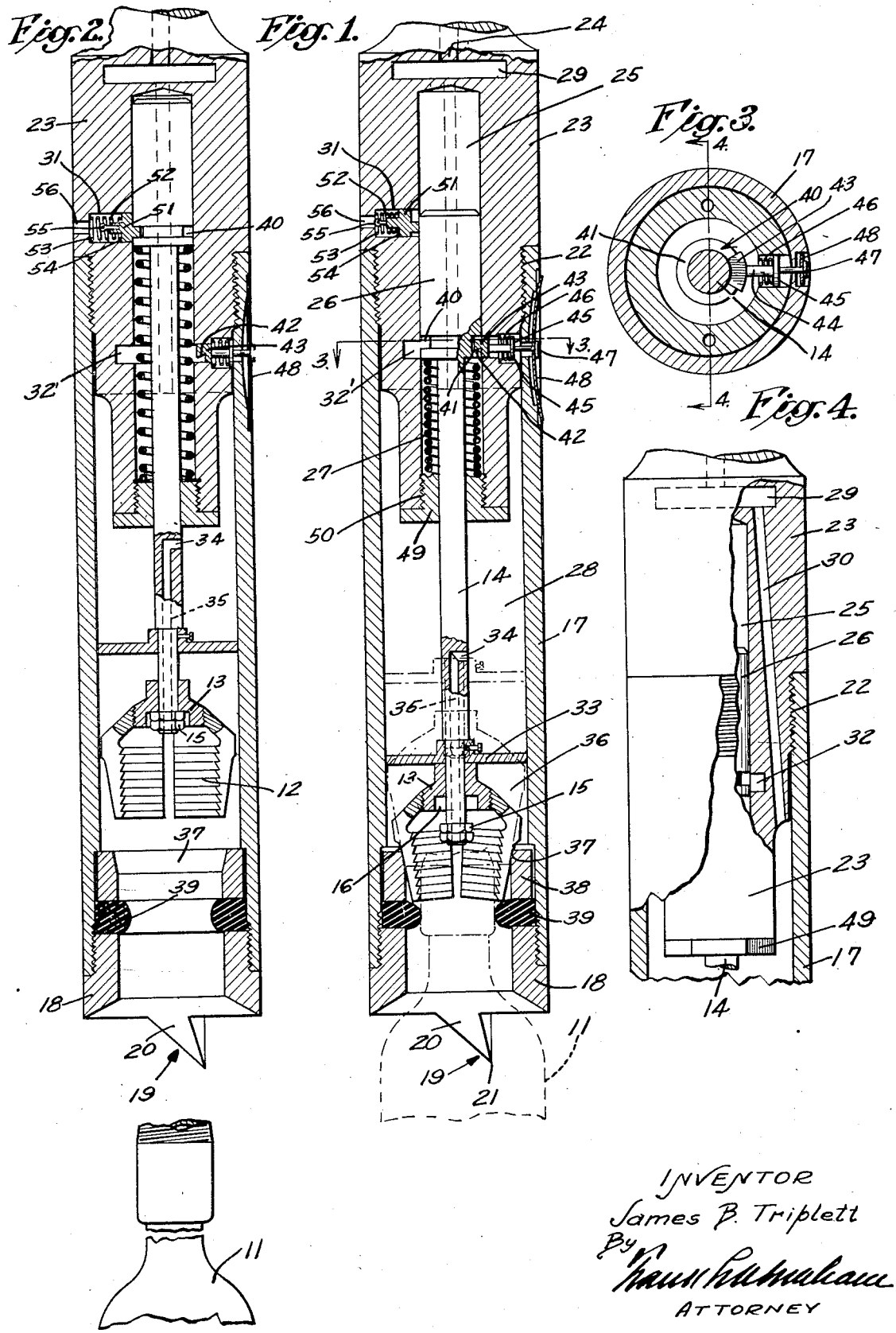
INVENTOR
James B. Triplett
By
ATTORNEY Patented Mar. 10, 1931

1,795,322

UNITED STATES PATENT OFFICE

JAMES B. TRIPLETT, OF WHITTIER, CALIFORNIA, ASSIGNOR OF ONE-HALF TO HERMAN C. SMITH, OF WHITTIER, CALIFORNIA, DOING BUSINESS UNDER THE FICTITIOUS NAME OF H. C. SMITH MFG. CO.; WM. H. CAMPBELL AND WM. H. MAXWELL EXECUTORS OF LAST WILL OF SAID JAMES B. TRIPLETT, DECEASED

ROTATABLE AND RELEASABLE FISHING TOOL WITH CIRCULATION

Application filed May 6, 1926. Serial No. 107,108.

My present invention, like that set forth in my application Serial No. 735,331, filed September 2nd, 1924, and allowed on March 10th, 1926, relates to slip-socket "fishing" tools in which means are provided whereby a "fish" after the same has been engaged, may be released, in case its present removal is found impracticable.

It is an object of this invention to provide a fishing tool comprising slips interconnected by a collar of special design and secured, in a novel way, to a mandrel; but my present invention relates more particularly to the provision of certain features whereby a circulating fluid may be downwardly delivered, through a shell or slip-enclosing element within which said mandrel may be centrally disposed, and through a portion of said mandrel,—provision being made for the use of this circulating liquid in the operation of said slips, and provision being also made for the delivery of the mentioned circulating liquid into and through a fish engaged thereby.

Other objects of my invention, including the provision of improved means for the retention of a compression spring within a plug of special design, the provision of improved means for operating a setting dog, and/or a releasing or "disqualifying" dog, the provision of means whereby the weight of a fish may contribute to the vertical compression, and consequent lateral expansion, of an annular packing member adapted to surround the upper end of a fish and to assure downward delivery of a circulating fluid therethrough, and/or the provision of a novel lifting and guiding finger upon the lower end of a fishing tool, may be best appreciated from the following description of an illustrative embodiment of my invention, in which Fig. 1 is, for the most part, a central vertical section showing interior parts in fish-engaging positions, certain parts being however shown, in dotted lines, in a pre-engagement position occupied during the lowering of the tool into a well.

Fig. 2 is a vertical section comparable with Fig. 1, but showing interior parts in a position in which they are not only disengaged from a fish but disqualified for the retention of a fish, until the device shall be reset.

Fig. 3 is a horizontal section, taken substantially in the plane indicated by the line 3—3 of Fig. 1.

Fig. 4 is a partial section of a portion of the organization illustrated in Figs. 1 and 2, but broken away to a plane at right angles thereto, somewhat as indicated by the line 4—4 of Fig. 3,—this view being designed more particularly to show a preferred arrangement of conduits for the passage of a circulating fluid.

Referring more particularly to the details of that specific embodiment of my invention chosen for purposes of illustration, 11 being a fish to be removed from the bottom of a well, I show a set of slips 12 as integrally but somewhat resiliently connected with and dependent from a collar 13; and this collar may be suspended in any preferred way at the lower end of a suitable mandrel 14 (as by providing an enlargement in the form of a nut or nuts 15 at the lower end of said mandrel and a socket or depression 16 in the lower surface of said collar) said slips and mandrel being shown as housed within and protected by a slip-enclosing shell 17.

The shell 17 or a terminal part or extension 18 thereof may be provided with a fish-lifting and/or guiding finger 19, shown as provided with an inclined or fish-camming inner surface 20 having an inclined edge and a comparatively sharp point 21,—that surface of the finger 19 which is not seen in the drawings being preferably cylindrical and such as to constitute a continuation of the outer surface of the shell 17 or its terminal part 18,—the described form of finger being especially suitable to the lifting and guidance of any fish which may be lodged in an inclined position, and to bring such a fish into a position rendering the same engageable by the slips 12, or the like.

I show the upper end of the shell 17 as internally threaded at 22, for engagement by corresponding threads upon a chambered one-piece main body 23,—this body being preferably provided at its upper end with means such as a hollow "pin", not shown, to provide for its attachment to a rotary drill string and for the downward delivery of a circulating fluid into a central inlet passage 24; and, instead of permitting such circulating liquid to pass into a main chamber 25, provided within the chambered main body 23 (this main chamber being intended for the reception of a head 26, upon the upper end of the mandrel 14 and for the housing of a compression spring 27 therebelow) I prefer to advance the circulating liquid delivered into the central passage 24 toward a main chamber 28 within the shell 17 by means such as a manifold passage 29 and inclined bores 30, of the general character best shown in Fig. 4,—the last mentioned passages being so positioned as not to intersect radial or other bores 31 and 32, 32', respectively provided for the housing of dogs comprised in a slip-controlling organization hereinafter described.

In order to provide hydraulic means assisting in the gripping of any fish engaged between the slips 12 upon the lowering of my fishing tool over the upper end of such fish (the collar 13 and slips 12 presumably occupying, at the moment of engagement, such a position as that in which they are shown in dotted lines in Fig. 1) I may secure upon the mandrel 14, its equivalent, means such as a plunger or plate 33, downwardly movable under an interior pressure but incapable of rising to such a position as to close an opening 34, through which, after a downward impulse has been imparted to the plate 33, the circulating liquid may advance (as by way of a central passage 35) into a hollow fish 11,—or into a space 36 below the plate 33, the latter being presumably in open communication with the interior of the fish.

The slips 12, being shown as provided with upwardly inclined teeth and as externally tapered for engagement by inwardly inclined faces 37 upon a part 38 (which, in the illustrated embodiment of my invention is annular and may be capable of limited vertical movement within the shell 17) may be automatically contractible, upon a lifting of the shell 17, even though nothing equivalent to the plate 33 be employed; but, by the use of the described hydraulic means, or by the use of equivalent means, the action of any admitted fluid pressure upon the upper surface of the plate 33 being (coincident with gravity and) more prompt and powerful than its action upon the lower surface thereof, the slips 12 may be forced (as upon the opening of a valve or the starting of a slush pump at the top of a well) from an upper (non-gripping) to a lower (gripping) position,—the described hydraulic means thereby exerting some gripping effect even in advance of the lifting of the shell 17; and, by providing between the annular members 18 and 37 (the latter being shown as relatively movable) a compressible annular packing 39, inwardly expansible under vertical pressure and adapted to engage the neck of a hollow fish 11, I may not only graduate or moderate the camming action of the inclined faces 37 upon the slips 12, but also provide a practically tight joint,—substantially preventing leakage of the circulating liquid about the neck of the fish, and thereby compelling the advance of such liquid through said fish, for a loosening and/or lifting effect.

The more important novel features and the mode of operation of my fishing tool having been indicated above, I may mention, for the sake of completeness, the fact that, as in the former application mentioned, I prefer to provide my fishing tool with slip-controlling devices which may comprise an annular groove 40, surrounding the head 26 upon the upper end of the mandrel 14,—said groove being shown as provided with an undercut lower surface 41 engageable by a correspondingly inclined surface 42 upon a setting dog 43, and this dog being outwardly pressed by any suitable means but releasable only by an upward movement of the chambered main body 23, or its equivalent (presumably with the shell 17, or its equivalent) relatively to the mandrel head 26. Upon the release and outward movement of the dog 43 (which may comprise a stem 44 carrying a head 45 engageable by a compression spring 46 and/or a head 47 engageable by an inwardly flexed leaf spring 48, or the like,— the use of a spring of the latter type being favorable to an application of thumb-pressure in the setting of the dog 43, or its equivalent) the mentioned compression spring 27, or its equivalent (shown as insertible through the lower end of the chambered main body 23, and as retained therein by a plug 49, engaging an interior thread 50 at the lower end thereof) may be immediately and continuously effective in improving the grip of the slips 12, or the like, upon a fish 11; and, in case an upward pull upon the shell 13, with or without a simultaneous slow rotation thereof and/or a downward circulation of liquid, is ineffective to dislodge the fish 11, so that the temporary or permanent release of said fish becomes desirable, such release may be effected by a mere lowering of the body 23 sufficiently to permit the operation of releasing or disqualifying means such as a dog 51, shown as housed and movable within the mentioned bore 31 in the main body 23.

The dog 51, or its equivalent, may obviously be manipulated either by oppositely-tending means of the general character just described, or as in my mentioned prior application, by means of an inwardly-acting compression spring 52 interposed between a fixed shoulder 53 and an oppositely disposed shoulder 54 upon the dog 51,—the latter being shown as provided with a retracting eye 55, accessible through an opening 56,—in which opening any threaded or other plug may be removably inserted, to prevent entrance of a circulating fluid; and, using this or an equivalent construction, it will be understood that a sufficient relative depression of the main body 23, subsequently to the release of the setting dog 43 upon the elevation of the main body 23 in the described manner, may be automatically effective to permit the dog 51, or its equivalent, to enter the mentioned annular groove 40, and thereby to hold the shell 17 (provided directly or indirectly with the inclined faces 37, to engage and contract the slips 12) in a relatively depressed position, such that said slips are not only permitted to release the fish 11 but are "disqualified", or rendered incapable of reliably gripping any fish, until the dog 43 or its equivalent shall be reset,— as upon the elevation of the fishing tool to the surface of the ground, where the spring 27 may again be placed under compression and the dog 43 forced inward, to reset.

Although I have herein described a single complete embodiment of my invention, it should be understood not only that various features thereof may be independently used but also that numerous modifications might be made by those skilled in the art to which this case relates, without the slightest departure from the spirit and scope of this invention, as the same is indicated above and in the following claims.

I claim as my invention:

1. A fishing tool comprising: a slip-enclosing element, a part having an inclined face and carried within the element; jaw-type slips movable in the element into engagement with the inclined face to grip a fish; a mandrel, slidably carrying the slips for limited movement, said mandrel being movable within said slip-enclosing element; means tending to move said mandrel upward in said slip-enclosing element; slip-controlling devices which include, a body on the element, means on the body whereby the elevation of said slip-enclosing element relative to the slips, after engagement of a fish by said slips, is rendered effective to improve the grip of the slips and means whereby a subsequent depression of said slip-enclosing element causes said slips to be retained in a fish-releasing position; and hydraulically operable means tending to advance said slips relatively to said inclined face.

2. A fishing tool embodying: a slip enclosing element adapted to be carried by a string of drill pipe; slips supported within said element and movable relatively thereto; hydraulically operated means within said slip enclosing element for advancing said slips against a fish; and means for circulating liquid under pressure through said slip enclosing element and into engagement with a fish held by said slips.

3. A fishing tool embodying: a slip enclosing element adapted to be carried by a string of drill pipe; slips supported within said element for movement relatively thereto; a slip engaging part mounted in the lower end of said enclosing element having an inclined face, means for operating the slip into engagement with the face to grip a fish, yieldable means adapted to support said engaging part on the element and to engage a fish received by said slips; and means for directing a circulating fluid delivered through said enclosing element against a fish received by said slips.

4. A fishing tool comprising: a slip enclosing element adapted to be carried by a string of drill pipe; slips supported within said element, for movement relatively thereto, means for operating the slips to a fish, said element being provided with a fluid passage for delivering circulating liquid to a point between said slips and adapted to direct said liquid into a fish received by said slips; and a packing member in the lower end of said enclosing element adapted to seal with a fish received by said slips.

5. A fishing tool comprising: a slip enclosing element adapted to be carried by a string of drill pipe; slips supported within said element and movable relatively thereto; remotely controlled means for operating said slips; means for continuously delivering a circulating fluid through said element; and means within said slip enclosing element for conducting said fluid through said element.

6. A fishing tool comprising: a slip-enclosing element adapted to be carried by a string of drill pipe; slips supported within said element and movable relatively thereto; means in said element for conducting circulating fluid therethrough; a slip engaging part in said element having an inclined face; yieldable means supporting said part and adapted for lateral expansion into engagement with a fish, said fluid conducting means being adapted to direct circulating fluid against a fish received by said slips.

7. A fishing tool comprising: a main body; a slip enclosing element supported thereby; a mandrel vertically movable within said body and extending into the element; slips supported by said mandrel in movable relation to said enclosing element; and hydraulically operated means within said enclosing element for advancing said slips.

8. In a fishing tool of the character described, a tubular element adapted to be carried by an operating string of drill pipe, a mandrel operable longitudinally in the element, a part carried within the element having an inclined face, yielding packing supporting said part, slips on the mandrel and means for operating the mandrel to bring the slips into engagement with the said face to grip a fish, the said packing being compressible into sealing engagement with the fish upon engagement of the slips with the face, there being a fluid passage in the mandrel to pass fluid from the element to the fish.

9. In a fishing tool of the character described, a tubular element adapted to be carried by an operating string of drill pipe, a mandrel operable longitudinally in the element, a part carried within the element having an inclined face, yielding packing supporting said part, slips on the mandrel, and means for operating the mandrel to bring the slips into engagement with the said face to grip a fish including, a plunger plate on the mandrel to slidably engage the interior of the element, the said packing being compressible into sealing engagement with the fish upon engagement of the slips with the face, there being a fluid passage in the mandrel to pass fluid from the element to the fish.

10. In a fishing tool of the character described, a tubular element adapted to be carried by an operating string of drill pipe, a mandrel operable longitudinally in the element, a part carried within the element having an inclined face, yielding packing supporting said part, slips on the mandrel, and hydraulic means for operating the mandrel to bring the slips into engagement with the said face to grip a fish, the said packing being compressible into sealing engagement with the fish upon engagement of the slips with the face, there being a fluid passage in the mandrel to pass fluid from the element to the fish.

11. In a fishing tool of the character described, a tubular element adapted to be carried by an operating string of drill pipe, a mandrel operable longitudinally in the element, a part carried within the element having an inclined face, yielding packing supporting said part, slips on the mandrel and remotely controlled means for operating the mandrel to bring the slips into engagement with the said face to grip a fish, the said packing being compressible into sealing engagement with the fish upon engagement of the slips with the face, there being a fluid passage in the mandrel to pass fluid from the element to the fish.

In testimony whereof, I have hereunto set my hand at Los Angeles, California, this 27th day of April, 1926.

JAMES B. TRIPLETT.